United States Patent [19]

Moore et al.

[11] 4,031,704
[45] June 28, 1977

[54] THERMAL ENGINE SYSTEM

[76] Inventors: Marvin L. Moore, 16204 Diana Lane, Apt. 323A, Houston, Tex. 77062; William M. Moore, 8820 Mountain Path Circle, Austin, Tex. 78750

[22] Filed: Aug. 16, 1976

[21] Appl. No.: 714,300

[52] U.S. Cl. .................................. 60/325; 60/413; 60/527; 417/379

[51] Int. Cl.² ......................................... F03G 7/06

[58] Field of Search ............ 60/325, 413, 527, 528, 60/529; 417/379

[56] References Cited

UNITED STATES PATENTS

| | | | |
|---|---|---|---|
| 2,918,085 | 12/1959 | Govan et al. | 60/413 X |
| 3,986,354 | 10/1976 | Erb | 60/325 |

*Primary Examiner*—Allen M. Ostrager
*Assistant Examiner*—Stephen F. Husar
*Attorney, Agent, or Firm*—Arnold, White & Durkee

[57] ABSTRACT

A thermal engine system is characterized by a cylinder having a suitable working fluid disposed therein and having a piston reciprocally movable in first and second directions within the cylinder, the piston dividing the cylinder into first and second pressurization regions. In one embodiment, a thermally responsive, expansible member is operatively connected directly at one free terminus thereof to the piston. In an alternate embodiment, the free terminus of the thermally responsive, expansible member is indirectly attached to one or more double-acting piston-cylinders through lever connections. The thermally responsive, expansible member is connected at the second end thereof to suitable means for maintaining the second end of the expansible member in a substantially stationary position. The thermally responsive, expansible member responds to the temperature of driving fluids introduced thereto to alternately thermally expand and contract to thereby cause reciprocating motion of the piston within the cylinder. Reciprocation of the piston within the cylinder alternatively pressurizes working fluid disposed within the first and the second regions of the cylinder. The pressure energy transmitted to the working fluid in the first and second regions of the cylinder is stored within a suitable energy storing arrangement to be utilized in any desired manner.

10 Claims, 3 Drawing Figures

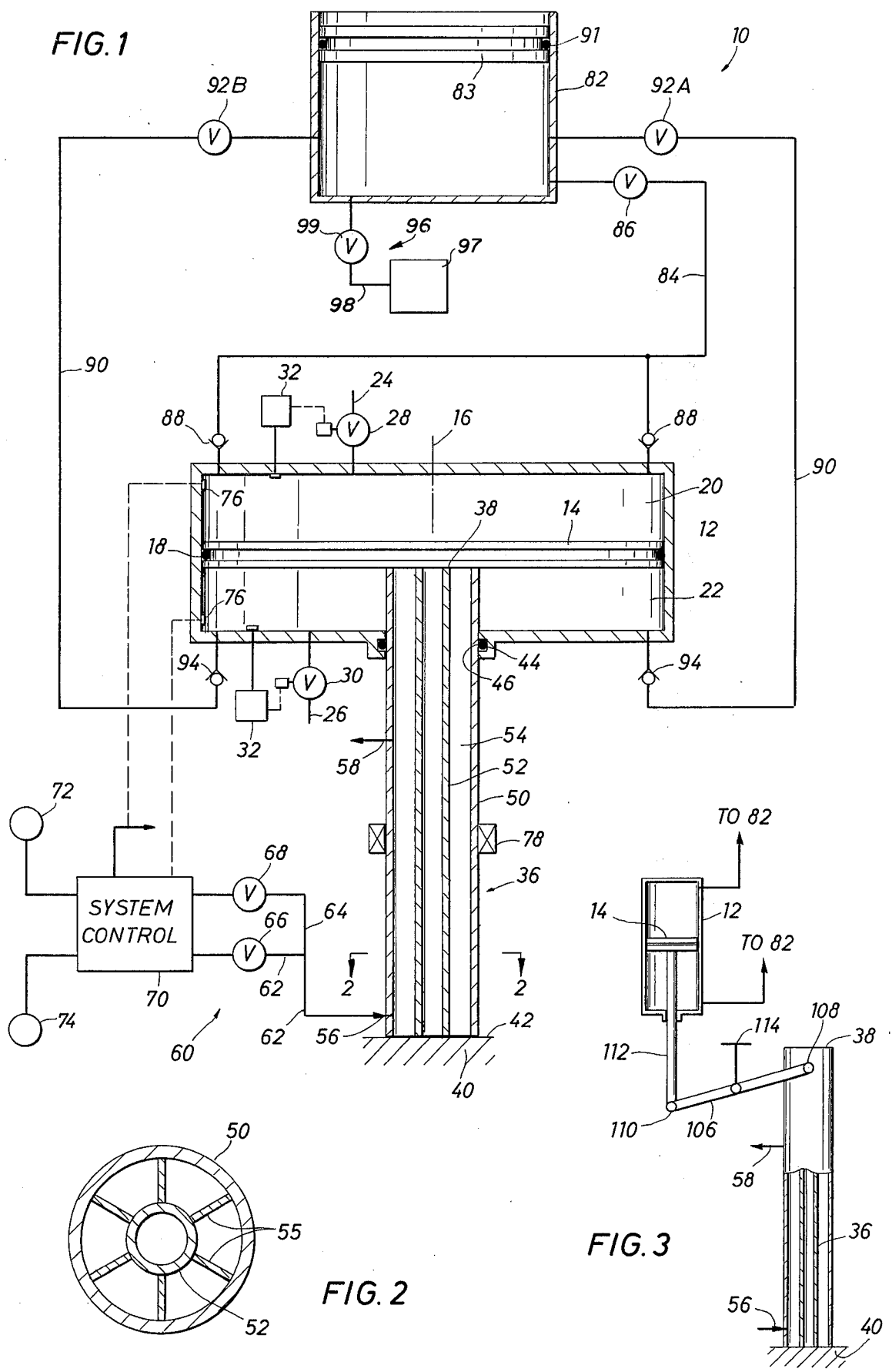

THERMAL ENGINE SYSTEM

BACKGROUND OF THE INVENTION

1. Field of the Invention

This invention relates to a thermal engine system and in particular, to a thermal engine system utilizing a double-acting piston-cylinder arrangement to convert heat to mechanical energy.

2. Description of the Prior Art

Recently, attention has been directed to the necessity of more efficiently utilizing available energy sources. As a result, interest and activity has been focused upon the utilization of waste heat energy, such as that now lost in the effluent stack gases from all types of commercial and industrial furnaces, including conventional fossil fuel power generation plants or the heat energy present in cooling fluids, such as water, at the outlet of nuclear fuel power generation stations. Alternately, naturally occurring sources of heat, such as geothermal heat energy or solar energy, may be utilized as suitable energy sources. It has been suggested that this heat energy, which is presently being wasted or not efficiently utilized, can generate useful work. It is appreciated with regard to several of the above mentioned heat sources, since no benefit is presently being derived from much of this waste heat, any conversion thereof into useful work enhances the overall power output of the facility producing that waste heat.

It is advantageous therefore to provide a thermal engine system acting to convert waste heat to useful work with a predetermined level of efficiency so that the energy heretofore totally wasted may be utilized to generate useful work. Also, it is advantageous to provide a thermal engine system acting to convert naturally occurring geothermal or solar heat energy to useful work. It is also advantageous to provide a thermal engine system utilizing the waste heat energy of a power generating station in order to cause thermal expansion and contraction of a thermally responsive expansible member. It is of further advantage to utilize the thermally induced movement of the expansible member to reciprocate a piston disposed within a cylinder in a double-acting manner so as to alternately pressurize a working fluid disposed in first and second regions within the cylinder. It is of still further advantage to provide a float pressured accumulator or like storage element to store pressure energy transmitted to the working fluid and utilize that stored energy to do useful work. It is also advantageous to indirectly couple a thermally responsive expansible member with one or a plurality of double-acting piston-cylinders through suitable lever arrangements to utilize displacements of the expansible member to pressurize a working fluid disposed in each cylinder.

It is noted that it is well known to utilize expansion of expansible members to convert heat energy to generate motion of associated elements. For example, U.S. Pat. No. 170,447 (Muskov), U.S. Pat. No. 348,841 (Hainley), U.S. Pat. No. 1,134,147 (Miller), U.S. Pat. No. 3,699,769 (Bondurant), and U.S. Pat. No. 3,803,845 (Dennis), all disclose thermal engines which utilize the expansion of a thermally expansible member to cause motion of associated mechanical elements. In U.S. Pat. No. 3,291,054 (McKenzie), electrical energy is utilized to rectilinearly expand a thermally responsive expansible member to drive a single-action piston.

SUMMARY OF THE INVENTION

This invention relates to a thermal engine system for converting heat energy which may have been heretofore wasted into useful work. The thermal energy system includes a cylinder having with a working fluid therein. A double-acting piston is reciprocally movable in first and second directions along the axis of the cylinder and divides the cylinder into first and second regions in which working fluid is disposed. In one embodiment of the invention, an expansible member, such as a plurality of elongated concentrically disposed heat expansion columns or suitably fastened segmented members, is directly attached at a first end thereof to the piston and secured stationarily relative thereto at the second end thereof. Means are provided for alternately introducing driving fluids of predetermined temperatures into a heat exchange relationship with the expansible member, for example, a valving and piping arrangement, to permit introduction of fluid at a predetermined temperature into the annular volumes defined between the concentric columns or columns of other cross sectional configuration.

The expansible member responds to the introduction of driving fluids thereto to alternately rectilinearly expand or contract and to thereby alternately pressurize working fluid within the first and second regions of the cylinder. An energy storage arrangement, such as a float pressured accumulator, is connected in fluid communication with the first and second regions of the cylinder and operates to store the pressure energy transmitted to the working fluid by the expansion and contractions of the expansible member. A suitable energy conversion device, such as a fluid turbine, centrifugal pump, or any prime mover, may be operatively connected to the energy storing device to convert the pressure energy accumulated and stored therein into useful work. In an alternate embodiment, levers are pivotally connected to one end of the expansible member and to the piston to transmit the rectilinear expansions and contractions of the expansible member to pressurize the working fluid within one or more double-acting cylinders. The working fluid from these cylinders enters the float pressured accumulator and the pressure energy accumulated and stored therein may be converted into useful work.

BRIEF DESCRIPTION OF THE DRAWINGS

This invention will be more fully understood from the following detailed description of a preferred embodiment thereof, taken in connection with the accompanying drawings, in which:

FIG. 1 is a diagrammatic view of a thermal engine system embodying the teachings of this invention;

FIG. 2 is a sectional view, taken along section lines II—II of FIG. 1, of an expansible member utilized in a thermal engine system embodying the teachings of the invention; and, FIG. 3 is a diagrammatic view of an alternate embodiment of a thermal engine system embodying the teachings of the invention.

DESCRIPTION OF THE PREFERRED EMBODIMENT

Throughout the following descriptions, similar reference numerals refer to similar elements in all figures of the drawings.

Referring to FIG. 1, a thermal engine energy system generally indicated by reference numeral 10 and embodying the teachings of this invention is illustrated. Although the engine 10 is described in connection with utilization of waste heat from a power generating station, it will be appreciated by those skilled in the art that the engine 10 may be used in any environment wherein sufficient temperature differentials are present. As other examples, heat energy present from a geothermal source, or any other naturally occurring heat source, may be utilized to derive heat energy for an expansion driving fluid for the engine 10. It is also apparent to those with skill in the art that any lower temperature cooling fluid, such as naturally occurring water sources, may be utilized as a contraction driving fluid for an engine embodying the teachings of this invention.

The thermal engine 10 includes a cylinder 12 fabricated of a suitable material such as alloy steel and having disposed therein a double-acting piston 14. The piston 14 is rectilinearly movable in a first and a second direction along an axis 16 of the cylinder 12. Suitable sealing members 18, such as O-ring seals, are provided to insure fluid-tight integrity between a first region 20 and a second region 22 defined on the interior of the cylinder 12 by the double-acting piston 14. A suitable working fluid, such as hydraulic fluid, is disposed within each of the regions 20 and 22. The regions 20 and 22 each communicate through a working fluid reservoir (not shown) through conduits 24 and 26, respectively. Valve elements 28 and 30 are respectively connected within the conduits 24 and 26. Each valve 28 and 30 is operated by a pressure controller 32, the controllers 32 being preset to open the valves 28 and 30 whenever predetermined pressures are generated within the regions 20 and 22, respectively. The interaction of the valves 28 and 30 in response to pressures generated within the regions 20 and 22, respectively, is discussed herein. The heads of the cylinder 12, although illustrated as flat, may be curved or otherwise configured to facilitate fluid flow into the associated fluid reservoir, as is described herein.

In the embodiment of the invention shown in FIG. 1, an expansible member generally indicated by reference numeral 36 has a first end 38 directly attached to the piston 14 and a second end 40 mounted within suitable means 42 for maintaining the second end 40 of the expnsible member 36 substantially stationary and fixed relative to the piston 14. The expansible member 36 extends through an opening 44 in the base of the cylinder 12 and suitable seals such as O-rings 46 are provided to maintain fluid-tight seal integrity between the second region 22 and the exterior of the cylinder 12.

The expansible member 36 is a member that is thermally responsive to expand and contract upon presentation of expansion and contraction driving fluids thereto. The member 36 is suitably configured so as to provide material strength in both the tension and compression modes while affording maximum and uniform heat transfer between the driving fluids and the member 36. The member 36 may exhibit any suitable cross section consonant with the above limitations. As an example, as seen in FIG. 2, the expansible member 36 includes at least a first, outer, tubular member 50 concentrically surrounding a second, inner, tubular member 52. The tubular members 50 and 52 are both of suitable length and are concentically disposed relative to the axis 16 and are supported in this configuration by a suitable stiffener 55. The tubular members 50 and 52 may be of any length whose expansion and contraction imparts the desired motion for the desired energy generation; for steel, a length of 50 feet or longer is desirable and, with the predetermined cross sectional area, can generate forces in the range of one million pounds or more per stroke. The first and second tubular members 50 and 52 are each fabricated of a suitable material having a high co-efficient of thermal expansion, such as alloy steel, although it is understood that other materials may be utilized. It is also understood that although only a first and a second tubular member is illustrated, it is within the contemplation of this invention to provide any suitable number of concentrically disposed tubular members fabricated of a material having a high co-efficient of thermal expansion. The tubular members 50 and 52 may be of integral construction, or, if desired, of segmented construction, so long as the members are of sufficient strength to withstand the compression and tension loads imposed during the strokes of the piston.

An annular volume 54 is defined between the interior of the first tubular member 50 and the exterior of the second tubular member 52, the annular volume 54 having a suitable inlet 56 and outlet 58 provided to permit fluid communication to the volume 54. It is appreciated by those skilled in the art that the inlet 56 and outlet 58 may be located at positions other than those indicated. As seen in FIG. 1, the inlet 56 and outlet 58 are suitably connected to means 60 for introducing a first and second driving fluid, each of predetermined temperature, into the annular volume 54 to place the driving fluid in a heat exchange relationship with the expansible member 36. The means 60 may conveniently include inlet conduits 62 and 64, each having valve elements 66 and 68, respectively connected therein. The valves 66 and 68 are operatively associated with a suitable controller 70 to admit expansion driving fluid from a suitable source 72 to the volume 54 or contraction driving fluid from a suitable source 74 to the volume 54. The controller responds to signals input thereto, such as the distance of travel of the piston 14 within the cylinder 12, or the temperature of the expansible member 36, as sensed by appropriately placed sensors 76 (shown to sense displacement of the piston 14) and to introduce driving fluid of an appropriate temperature to the volume 54 and place that driving fluid in a heat exchange relationship with the expansible member 36.

It is understood to those skilled in the art that a fairly uniform heat transfer rate between driving fluid and expansible member 36 should be most effective to extract maximum displacement of the member 36. This may require, in some instances, that conduits, or jackets, of thin metal or, alternatively, of non-metal material, be suitably affixed to the members comprising the expansible member 36 so that rapid, uniform heat transfer occur over the entire length of the member 36. The jackets may be welded or otherwise attached to the inside, outside, or both of the members (e.g., the tube 52), to form a suitable flow passage with the member itself defining one boundary of the passage. Disposed circumferentially about the expansible member 36, intermediate the ends 38 and 40 thereof, are means 78 for constraining the member 36 to permit only rectilinear displacement along the axis 16 in response to the driving fluid. The means 78 may comprise, as an example, bearing members.

The expansion driving fluid from the source 72, such as steam or hot water, may derive its heat content from a variety of sources. Effluent stack gases from a conventional fossil fuel power generating plant or heated cooling water taken from the outlet of a nuclear power generating facility are but two examples of a suitable source of heat for the driving fluid. It is also understood that the effluent stack gas or cooling water exhibit a sufficient temperature so that they themselves may be utilized as the driving fluid and placed into a heat exchange relationship with the members 50 and 52 to cause those members to thermally expand or contract rectilinearly along the axis 16. Similarly, the contraction driving fluid from the source 72, such as naturally occurring water, may either indirectly or directly provide a heat sink to take heat from the heated member 36 upon introduction into a heat exchange relationship therewith.

The double-action piston 14 mounted at the first end 38 of the expansible member 36 responds to the rectilinear thermal expansion and contraction of the tubular members 50 and 52 by displacing within the cylinder 12. Displacement of the piston 14 within the cylinder 12 alternately pressurizes working fluid in the first and second regions, 20 and 22, respectively.

The pressure energy transmitted to the working fluid within the regions of the cylinder 12 is stored within suitable energy storing means 82, such as a float pressured accumulator, although it is understood that other suitable energy storing devices may be utilized. Means 83, such as a predetermined weight, are provided for pressurizing the working fluid with the closed, working fluid system. The means 83 is suitably sealed, as with O-ring 91, so as to be movable to maintain the desired hydraulic pressure in the accumulator system with changing volume. Of course, any suitable configuration may be utilized for the means 83, including a plurality of smaller, predetermined weight arrangements, each suitably sealed and movable to maintain the desired accumulator system pressure. The accumulator 82 is respectively connected to the first region 20 within the cylinder 12 by conduit arrangement 84 which may include a flow control device 86. A plurality of one way check valves 88 are provided to permit fluid communication between the first region 20 and the conduit arrangement 84 only during the portion of the stroke of the double-acting piston 16 that pressurizes working fluid within the first region 20 of the cylinder 12. The valve 86 may also be suitably associated, for example, with the control system 70, so that it is opened or closed depending upon the introduction of expansion or contractin driving fluid to the expansible member 36.

A second conduit arrangement 90 connects the second region 22 of the cylinder 12 with the float accumulator 82, the second conduit arrangement 90 which may have flow control devices 92A and 92B disposed therein. A plurality of check valves 94 are provided to permit communication between the second region 22 and the float accumulator 82 only during the portion of the stroke of the pistion 16 that pressurizes the working fluid within the second region 20 of the cylinder 16. The flow control devices 92A and 92B are also operatively associated with and controlled by the control arrangement 70 to permit these valves to be opened during the time when the other of the expansion or contraction fluid is introduced to the expansible member 36. It is understood, of course, that numerous other arrangements may be devised and are available in the art for association with the energy storage means to conduct the pressure energy transmitted to the working fluid to the energy storage means.

In operation, it is assumed that the system is initially at rest and that the piston 14 is contacted against the lower head of the cylinder 12 (as viewed in FIG. 1) and that driving fluid has yet to be introduced to the expansible member 36. A predetermined load has been imparted to the working fluid system by setting of the means 83 to a predetermined value.

As expansive driving fluid is introduced to the conduit 62 and valve 66 to the inlet 56 of the expansible member 36 the member responds thereto by expanding to cause rectilinear displacement of the piston 14 within the cylinder 12. The working fluid within the region 20 above the piston 14 is compressed by the expansion of the cylinder 14. Since the valve 28 is initially closed pressurization of the fluid within the region 20 opens the check valves 88 and is imparted through the conduit system 84 and the open valve 86 to the fluid disposed within the accumulator 82.

After a predetermined portion of the working stroke of the piston 14, the pressurization of the fluid within the working chamber 20 substantially equals the preset values of the means 83. Therefore, further rectilinear displacement of the pisiton 14 is prohibited.

However, the pressure actuator 32 is responsive to the pressure of the fluid within the region 20 and acts to open the valve 28 to permit sufficient fluid flow from the region 20 so that the check valves 88 may close and so that the piston 14 may complete its full stroke within the cylinder 12. Upon reaching the uppermost portion of the cylinder 12 sensor 76 causes the valving associated with the driving fluid introducing means 60 to reverse conditions and, may also close the valve 86 and open the valve 92 if they have been provided.

It may be appreciated that introduction of the contracting driving fluid through the expansible member 36 generates a contracting force which impels the piston 14 downwardly within the cylinder 12. Similar to the situation described in the upward compression stroke, downward movement of the piston 14 compressed the working fluid disposed in the region 22 and opens the check valves 94 so that the pressure energy transmitted to the working fluid in the region 22 may be accumulated within the storage means 82. However, after a predetermined portion of the downward stroke of this piston 14, the energy transmitted to the working fluid in the chamber 22 will substantially equal the preset working fluid system load set by the means 83. Therefore, unless pressure relief of the fluid within the chamber 22 is provided the piston 14 will be unable to return to its initial position so that the full magnitude of the stroke of the piston 14 may be available for the next occurring compression stroke.

The pressure controller 32 associated with the valve 30 therefor responds to the pressure within the region 22 to open the valve 30 and to permit sufficient outflow fluid from the region 22 to occur and to permit the check valves 94 to close. Continued contraction of the piston 14 may therefor occur to dispose the piston 14 in its initial position so that the maximum displacement of the piston 14 may be available during the next succeeding compression stroke.

It may be desirable to dispose in cooperation association with the float accumulator 82 means 96 for converting the pressure energy stored within the energy storage means (the accumulator 82) into useful mechanical work. For example, in FIG. 1, means 96 comprises an incompressible fluid turbine apparatus 97 connected by a conduit 98 having a flow control device at 99 therein. The flow control device 70 may also suitably controlled by control means (not shown).

It is, of course, understood that numerous alternative energy conversion or work producing apparatus may be utilized in the place of the turbine 97. For example, and although not illustrated within the figures, it is also within the teachings of this invention to provide a plurality of hydraulic float accumulators 82 and connect operatively to the outlet conduit 98 of each accumulator 82 a suitable piston cylinder arrangment operative to provide an impetus to a fly wheel, or the like, to convert the pressure energy of the fluid stored within the accumulator 82 into rotational mechanical energy. Alternatively, the pressure energy of the expansible member or of the working fluid generated by the expansion and contraction of the member 36 can be directly utilized to facilitate chemical reactions or deformation of mass.

As shown in FIG. 3, an alternate embodiment of the thermal engine embodying the teachings of this invention is shown. As seen in this alternate embodiment the expansible member 36 is indirectly coupled to the double-acting piston 14 disposed within the cylinder 12 through the agency of a lever 106. The lever 106 has a first end and a second end thereon, the first end being pivotally mounted, as at 108, ot the first end 38 of the expansible member 36. The second end of the lever 106 is pivotally mounted as at 110, to an extending piston rod 112 attached to the double-acting piston 14. A suitable fulcrum 114 is provided.

It is appreciated by those skilled in the art that rectilinear displacements of the expansible member 36 in response to the introduction of driving fluid thereto are amplified by the lever 106 to reciprocate the piston 14 within the cylinder 12. It may also be appreciated that several of such double-acting piston cylinder arrangements may be similarly lever connected to the expansible member 36 and remain within the contemplation of this invention. It is also apparent that the secondary hydraulic working fluid relief system may be advantageously utilized with the double-acting piston cylinder of the embodiment shown on FIG. 3.

It is thus seen that provided hereinabove is a thermal engine system operative to utilize heat energy in fluids or any form transferrable to fluids, to induce thermal expansions and contractions of a thermally responsive expansible member. One major advantage of the thermal engine system here disclosed is the ability to utilize heat energy now partially or totally wasted. However, it is also appreciated that since the thermal engine embodying the teachings of this invention generates elevated pressure, it is desirable in certain instances to utilize it with other energy converters or derive its heat energy from any other sources. The thermal expansions and contractions of the expansible member are transmitted to a suitable double-acting piston-cylinder arrangement to effect the alternate pressurization of working fluid within regions defined within the cylinder. The pressure energy transmitted to the working fluid in the appropriate regions of the cylinder is stored by suitable energy storing device and may be utilized, for example to convert the pressure energy into rotational mechanical energy or be used in another manner to thereby do useful work.

What is claimed is:
1. A thermal engine comprising:
   a cylinder having a working fluid therein;
   a piston reciprocally movable in first and a second direction within said cylinder and dividing said cylinder into a first and second region;
   an expansible member operatively associated with said piston and responsive to the temperature of a driving fluid to move said piston reciprocally within said cylinder to alternatively pressurize working fluid in said first and second regions; and,
   means for introducing driving fluid of a predetermined temperature into a heat exchange relationship with said expansible member.
2. Apparatus according to claim 1, further comprising:
   means associated with said first and second regions for storing the pressure energy transmitted to the working fluid disposed therein.
3. Apparatus according to claim 1, wherein
   said expansible member comprises a plurality of elongated, concentrically disposed columns, each column being fabricated of a material having a predetermined coefficient of thermal expansion,
   said column defining a predetermined plurality of annular volumes therebetween, said annular volumes being in fluid communication with said introducing means to receive said driving fluid therefrom.
4. Apparatus according to claim 1 wherein said expansible member has a first and a second end thereon, said first end being directly connected to said piston, and further comprising:
   means connected to said second end of said expansible member for maintaining said second end of said expansible member stationary with respect to said piston.
5. Apparatus according to claim 4, further comprising:
   means disposed circumferentially about said expansible member intermediate said first and said second ends thereof for permitting only rectilinear motion of said expansible member along an axis thereof in response to said driving fluid.
6. Apparatus according to claim 4, further comprising:
   means associated with said cylinder for maintaining said cylinder stationary and for minimizing the reaction force of said cylinder in response to the pressurization of said working fluid therein.
7. Apparatus according to claim 2 wherein said expansible member has a first and a second end thereon; and further comprising:
   a lever having a first end and a second end thereon, said first end of said lever being connected to said first end of said expansible member, said second end of said lever being connected to said piston.
8. Apparatus according to claim 2, wherein said energy storage means comprises a float accumulator.
9. Apparatus according to claim 2, further comprising:
   means associated with said energy storage means for converting the pressure energy stored therein to rotational mechanical energy.
10. Apparatus according to claim 9, wherein said energy conversion means includes a fluid turbine apparatus.

* * * * *